(12) United States Patent
Maerhufu et al.

(10) Patent No.: US 10,936,798 B2
(45) Date of Patent: Mar. 2, 2021

(54) TEXT EDITING METHOD, DEVICE, AND ELECTRONIC APPARATUS

(71) Applicant: BEIJING SOGOU TECHNOLOGY DEVELOPMENT CO., LTD., Beijing (CN)

(72) Inventors: Mansuer Maerhufu, Beijing (CN); Xin Cui, Beijing (CN); Yang Zhang, Beijing (CN)

(73) Assignee: BEIJING SOGOU TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 16/499,129

(22) PCT Filed: Jan. 4, 2018

(86) PCT No.: PCT/CN2018/071373
§ 371 (c)(1),
(2) Date: Sep. 27, 2019

(87) PCT Pub. No.: WO2018/176977
PCT Pub. Date: Oct. 4, 2018

(65) Prior Publication Data
US 2020/0042582 A1    Feb. 6, 2020

(30) Foreign Application Priority Data
Mar. 29, 2017  (CN) .......................... 201710198626.1

(51) Int. Cl.
*G06F 17/20* (2006.01)
*G06F 40/166* (2020.01)
(Continued)

(52) U.S. Cl.
CPC .......... *G06F 40/166* (2020.01); *G06F 3/0482* (2013.01); *G06F 3/04883* (2013.01)

(58) Field of Classification Search
CPC .. G06F 40/166; G06F 3/0482; G06F 3/04883; G06F 40/131; G06F 3/048; G06F 3/0488; G06F 3/04886; H04M 1/72552
See application file for complete search history.

(56) References Cited

U.S. PATENT DOCUMENTS

2012/0296635 A1* 11/2012 Brockett ............... G06F 40/131
704/9
2016/0092421 A1*  3/2016 Zhang .................. G06F 3/0237
715/271

FOREIGN PATENT DOCUMENTS

CN        101529494 A    9/2009
CN        102955768 A    3/2013
(Continued)

OTHER PUBLICATIONS

World Intellectual Property Organization (WIPO) International Search Report for PCT/CN2018/071373 dated Mar. 27, 2018 6 Pages.

*Primary Examiner* — Keith D Bloomquist
(74) *Attorney, Agent, or Firm* — Anova Law Group, PLLC

(57) ABSTRACT

Embodiments of the present disclosure provide a text editing method, device, and electronic apparatus. The method comprises: acquiring a text-to-be-edited; after receiving a trigger operation, generating an edit region; segmenting the text-to-be-edited into N number of text segments, and separately displaying the N number of text segments in the edit region, where N is a positive integer greater than 1; and after receiving an editing operation with respect to the N number of text segments, editing the N number of text segments based on the editing operation. The method and device provided in the embodiments of the present disclosure are used to solve technical problems such as complicated operations and low editing efficiency in current text editing technologies. The embodiments of the present disclosure (Continued)

may reduce complexity of text editing operations and improve technical effects of text editing efficiency.

20 Claims, 11 Drawing Sheets

(51) Int. Cl.
*G06F 3/0482* (2013.01)
*G06F 3/0488* (2013.01)

(56) References Cited

FOREIGN PATENT DOCUMENTS

| CN | 105159871 A | 12/2015 |
|----|-------------|---------|
| CN | 105955503 A | 9/2016 |

\* cited by examiner

TEXT EDITING METHOD, DEVICE, AND ELECTRONIC APPARATUS

RELATED APPLICATIONS

This application is a national stage entry of International Patent Application No. PCT/CN2018/071373, filed on Jan. 4, 2018, which claims priority to Chinese Patent Application No. 201710198626.1, titled "TEXT EDITING METHOD, DEVICE, AND ELECTRONIC APPARATUS", filed on Mar. 29, 2017, which is incorporated by reference in its entirety.

FIELD OF THE TECHNOLOGY

This application relates to the field of computer technologies and, specifically, to a text editing method, device, and electronic apparatus.

BACKGROUND

With a growing popularity of mobile devices, more and more users are getting used to communicating, reading and writing using the mobile devices. Therefore, it is inevitable that the users need to perform text editing operations on the mobile devices.

However, in current most widely used mobile phones, tablets, and other mobile terminals, the text editing operations often bring a more complicated operation experience to the users. When operations such as insertion, deletion, replacement, and exchange word and sentence positions, etc., need to be performed on a text segment, the users always need to manually move a cursor position to a target region, and then perform complicated operations, such as select, delete, re-enter and so on, so that the text editing on the mobile terminals becomes a complicated operation process.

As seen above, there are technical problems such as complicated operations and low editing efficiency in current text editing technologies.

SUMMARY

The present disclosure provides a text editing method, device, and electronic apparatus, which may be used to solve technical problems such as complicated operations and low editing efficiency in current text editing technologies.

In a first aspect, one embodiment of the present disclosure provides a text editing method, including: acquiring a text to be edited; after receiving a trigger operation, generating an edit region; segmenting the text to be edited into N number of text segments, and separately displaying the N number of text segments in the edit region, where N is a positive integer greater than 1; and after receiving an editing operation with respect to the N number of text segments, editing the N number of text segments based on the editing operation.

In a second aspect, one embodiment of the present disclosure provides a text editing method that is applied to an input method, including:

Acquiring a text-to-be-edited;

Segmenting the text-to-be-edited into N number of text segments, and separately displaying the N number of text segments, where N is a positive integer greater than 1; and After receiving an editing operation with respect to the N number of text segments, editing the N number of text segments based on the editing operation.

In a third aspect, one embodiment of the present disclosure provides a text editing device, including:

A first acquisition module that is configured to acquire a text-to-be-edited;

A generating module that is configured to, after receiving a trigger operation, generate an edit region;

A first segmenting module that is configured to segment the text-to-be-edited into N number of text segments, and separately display the N number of text segments in the edit region, where N is a positive integer greater than 1; and A first editing module that is configured to, after receiving an editing operation with respect to the N number of text segments, edit the N number of text segments based on the editing operation.

In a fourth aspect, one embodiment of the present disclosure provides a text editing device which an input method application is installed in, including:

A second acquisition module that is configured to acquire a text-to-be-edited in the input method application;

A second segmenting module that is configured to segment the text-to-be-edited into N number of text segments, and separately display the N number of text segments in the input method application, where N is a positive integer greater than 1; and A second editing module that is configured to, after receiving an editing operation with respect to the N number of text segments, edit the N number of text segments based on the editing operation in the input method application.

In a fifth aspect, one embodiment of the present disclosure provides a text editing apparatus, including: a memory, and one or more programs, where the one or more programs are stored in the memory; after configuration, one or more processors configured to execute the following operational instructions included in one or more programs: acquiring a text-to-be-edited; after receiving a trigger operation, generating an edit region; segmenting the text-to-be-edited into N number of text segments, and separately displaying the N number of text segments in the edit region, where N is a positive integer greater than 1; and after receiving an editing operation with respect to the N number of text segments, editing the N number of text segments based on the editing operation.

In a sixth aspect, one embodiment of the present disclosure provides a text editing apparatus, including: a memory, and one or more programs, where the one or more programs are stored in the memory; after configuration, one or more processors configured to execute the following operational instructions included in one or more programs: acquiring a text-to-be-edited in an input method application; in the input method application, segmenting the text-to-be-edited into N number of text segments, and separately displaying the N number of text segments, where N is a positive integer greater than 1; and in the input method application, after receiving an editing operation with respect to the N number of text segments, editing the N number of text segments based on the editing operation.

One or more technical solutions in the embodiments of the present disclosure at least have the following technical effects: in the text editing method and device, after receiving a trigger operation, segmenting the text-to-be-edited into N number of text segments, and separately displaying the N number of text segments in the generated edit region in order to save time for users to separate the text segments on their own reading way. Also, the users can be set up to directly edit the N number of text segments. The users do not need to find out and select the text segment to be edited by themselves from a consecutive text segment, reducing complexity of text editing operations and improving text editing efficiency.

The above description is merely an overview of the inventive scheme. In order to more apparently understand the technical means of the present disclosure to implement in accordance with the contents of specification, and to more readily understand above and other objectives, features and advantages of the present disclosure, specific embodiments of the present disclosure are provided hereinafter.

BRIEF DESCRIPTION OF THE DRAWINGS

In order to more clearly illustrate the technical solutions in the embodiments of the present disclosure, the drawings used in the description of the embodiments will be briefly described below. It is obvious that the drawings in the following description are only some embodiments of the present disclosure, and those skilled in the art can obtain other drawings based on these drawings without inventive efforts.

DESCRIPTION OF EMBODIMENTS

A text editing method, device, and electronic apparatus provided in the embodiments of the present disclosure are used to solve technical problems such as complicated operations and low editing efficiency in current text-editing technologies. The embodiments of the present disclosure may achieve technical effects of reducing complexity of text editing operations and improving editing efficiency.

In technical solutions of the embodiments of the present disclosure, the general idea is as follows: after receiving a trigger operation, generating an edit region; segmenting the text-to-be-edited into N number of text segments, and separately displaying the N number of text segments in the generated edit region in order to save time for users to separate the text segments on their own reading way. Also, the users can be set up to directly edit the N number of text segments. The users do not need to find out and select the text segment to be edited by themselves from a consecutive text segment, reducing complexity of text editing operations and improving text editing efficiency.

In order to better understand the above-described technical solutions, the following describes the technical solutions of the present disclosure in detail with reference to accompanying drawings and specific embodiments. It should be understood that the embodiments of the present disclosure and specific features in the embodiments are intended to describe the technical solutions of the present disclosure in detail rather than limit the technical solutions of the present disclosure. The embodiments of the present disclosure and the technical features in the embodiments may be mutually combined if they do not conflict with each other.

First Embodiment

Figure 1:
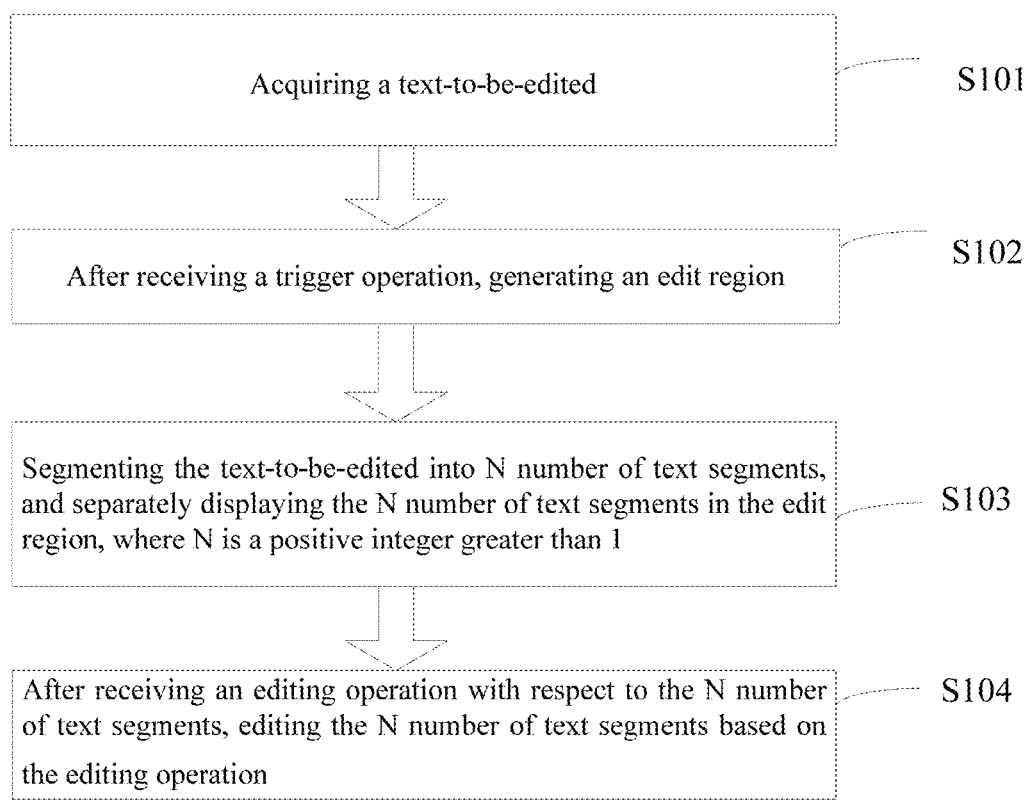
FIG. 1 illustrates a first flowchart of a text editing method according to an embodiment of the present disclosure.

One embodiment of the present disclosure provides a text editing method. As shown in FIG. 1, the method may include the following steps:

Step S101: Acquiring a text-to-be-edited.

Step S102: After receiving a trigger operation, generating an edit region.

Step S103: Segmenting the text-to-be-edited into N number of text segments, and separately displaying the N number of text segments in the edit region, where N is a positive integer greater than 1.

Step S104: After receiving an editing operation with respect to the N number of text segments, editing the N number of text segments based on the editing operation.

For example, the method is applied to an electronic apparatus with interactive features. The electronic apparatus may comprise a mobile phone, a tablet computer, a laptop computer, an all-in-one computer, a desktop computer and so on.

It should be noted that for generating an edit region in Step S102 and segmenting the text-to-be-edited into N number of text segments in Step S103, these two steps may be not sequential. In the specific implementation, in the beginning, the edit region is generated, and then the text-to-be-edited is segmented into the N number of text segments. Alternatively, in the beginning, the text-to-be-edited is segmented into the N number of text segments, and then the edit region is generated; Further, generating the edit region and segmenting the text-to-be-edited into N number of text segments may be simultaneously performed in parallel, which are not limited herein.

Next, specific implementation steps of the method provided in this embodiment are described in detail according to FIG. 1.

Step S101: Acquiring a text-to-be-edited.

There are many methods for acquiring the text-to-be-edited, including: ① Acquiring the text entered by a user in an input method application. For example, a user may input the text in an input method application to acquire the text entered by the user as the text-to-be-edited by a physical keyboard, a virtual keyboard, a sound collection device, a handwriting device, a touch screen, and other input devices; ② Acquiring the text in a clipboard. That is, receiving a copy or cut operation on the text-to-be-edited from a user, and acquiring the text-to-be-edited based on the copy or cut operation. For example, after a user selects the text-to-be-edited in an electronic book, a webpage or a document file and performs the copy operation to copy the text-to-be-edited to the clipboard, the text-to-be-edited is acquired from the clipboard; ③ Acquiring the text through a third party application. For example, when a user communicates with a peer user through a social networking software and other third party applications, after receiving the text-to-be-edited sent by the peer user through the network, the text-to-be-edited is acquired through the third party application; ④ Acquiring the text-to-be-edited by speech parsing. For example, a user may input a speech segment through a microphone. The speech segment is converted to the text by a speech analysis algorithm, and the converted text is used as the text-to-be-edited.

In a specific implementation process, the text-to-be-edited may include any combination of one or more of the following characters: Chinese characters, English letters, numbers, punctuation marks, emoticons, kaomoji, or mathematical symbols. Of course, the characters may also be Roman characters, etc., which are not limited herein.

Step S102: After receiving a trigger operation, generating an edit region.

There are various types of trigger operations. The different trigger operations may be set according to different needs:

① The trigger operation is an operation applied on a preset trigger key. For example, the trigger key may be any combination of one or more physical keys on an electronic apparatus. The trigger key may also be a preset region or a preset virtual key on an application interface of the input method. After receiving the trigger operation applied on the preset trigger key, the edit region is generated.

② The trigger operation is an operation used to move a cursor. For example, after a user inputs a text in an input method, when the text needs to be edited, the user may move the cursor through moving a mouse or clicking on a touch screen. When the electronic apparatus detects cursor movement, it is considered that the trigger operation is received, thereby generating the edit region.

Of course, in one embodiment of the present disclosure, the trigger operation may also be an operation that shakes the electronic apparatus; alternatively, the trigger operation may also be an operation that taps on the electronic apparatus; alternatively, the trigger operation may also be a swipe operation that swipes a current interface; alternatively, the trigger operation may also be a stereo touch control operation containing pressure information and/or contact area information, e.g., 3d-touch, which is not limited here.

In one embodiment of the present disclosure, the edit region may be an independent window interface which is independent of the application interface of the input method; the edit region may also be a subregion divided from the application interface of the input method, which belongs to a portion of the application interface of the input method. For example, after receiving the trigger operation, an original keypad region of the application interface of the input method may be used as the edit region.

Step S103: Segmenting the text-to-be-edited into N number of text segments, and separately displaying the N number of text segments in the edit region, where N is a positive integer greater than 1.

In one embodiment of the present disclosure, there are many methods for segmenting the text-to-be-edited into the N number of text segments:

① Segmenting the text-to-be-edited based on an on-screen sequence of the text-to-be-edited. Specifically, the on-screen sequence refers to a sequence that divides the text-to-be-edited according to the order of the text-to-be-edited displayed on a display screen. For example, when a user enters the text-to-be-edited "明天中午去吃什么？(what to eat at noon tomorrow?)" via an input method, in the beginning, the user enters the phrase "明天 (tomorrow)" on an input method keyboard. Based on an association function of the input method, the user directly selects "中午 (noon)" from the associated phrases, and then the user enters "去 (go)", "吃 (eat)", "什么 (what)", and "?" in order. Thus, the on-screen sequence of the text-to-be-edited is "明天 (tomorrow)", "中午 (noon)", "去 (go)", "吃 (eat)", "什么 (what)", and "?". Correspondingly, the text-to-be-edited "明天中午去吃什么？(what to eat at noon tomorrow?)" is segmented into six text segments, including "明天 (tomorrow)", "中午 (noon)", "去 (go)", "吃 (eat)", "什么 (what)", and "?".

② Segmenting the text-to-be-edited based on content of the text-to-be-edited. Specifically, in the beginning, semantic analysis is performed on the text-to-be-edited to acquire a semantic analysis result. Based on the semantic analysis result, the text-to-be-edited is segmented into N number of segments. For example, after a user copies the text-to-be-edited "读书最忌讳走马观花 (the worst taboo is a cursory reading)" in a document, the trigger operation is performed. Semantic analysis is performed on the text-to-be-edited using big data and deep learning algorithms. The text-to-be-edited "读书最忌讳走马观花 (the worst taboo is cursory reading)" is segmented into four text segments, including "读书 (reading)", "最 (the most)", "忌讳 (taboo)", and "走马观花 (gain a superficial understanding through cursory observation)".

For another example, after the user inputs the text-to-be-edited "Look at this dog, it's too big" using an input method, the trigger operation is performed to trigger semantic analysis on the text-to-be-edited using big data and deep learning algorithms. The text-to-be-edited "Look at this dog, it's too big" is segmented into seven text segments, including "Look at", "this", "dog", ",", "it's", "too", and "big".

Of course, in the specific implementation process, the methods for segmenting the text-to-be-edited into N number of text segments are not limited to the above two methods. The punctuation marks can also be used as delimiters to segment the text-to-be-edited. For English documents, the words may also be used as units to segment the text-to-be-edited. The methods are not limited and are not enumerated herein.

In one embodiment of the present disclosure, after segmenting the text-to-be-edited into the N number of text segments, the N number of text segments are displayed separately in the edit region such that the user can quickly access the text segment to be modified. In the specific implementation process, there are many methods for separately displaying the N number of text segments, including:

① Displaying separately the N number of text segments sequentially with delimiters. The delimiters (e.g., "l" or "&") can be used to separate each text segment. For example, "Look at this dog, it's too big" may be displayed separately as "Look at/this/dog/, /it's/too/big/".

② Displaying separately the N number of text segments with spaces. For example, a plurality of spaces may be inserted into every two text segments to separate distance between the text segments, thereby displaying separately the N number of text segments. For example, "Look at this dog, it's too big" may be displayed separately "Look at this dog it's too big".

Figure 2:
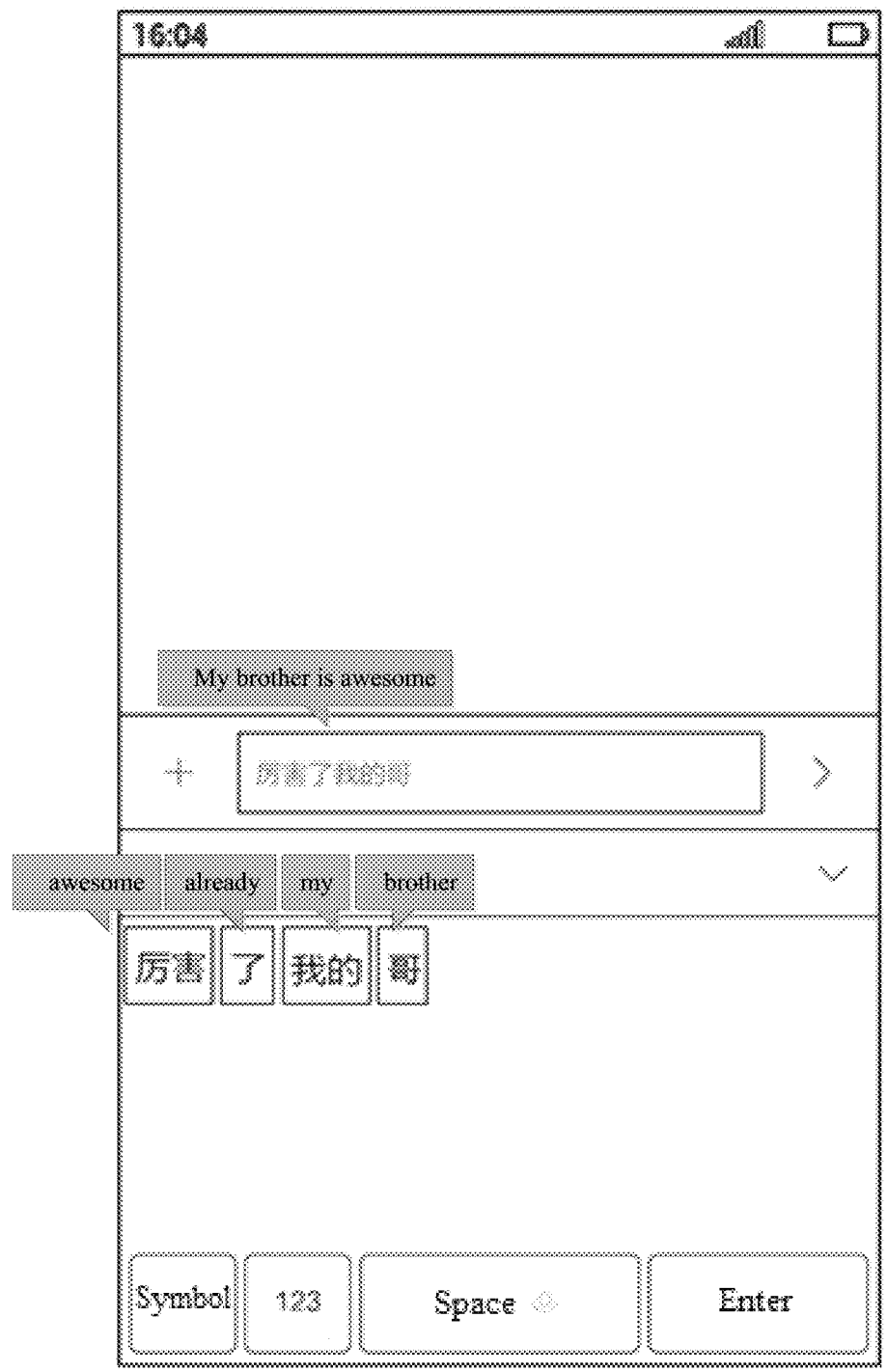
FIG. 2 illustrates a first schematic view of a text editing method according to an embodiment of the present disclosure.

③ Displaying the N number of text segments by N number of separated regions, respectively. For example, N number of separated bubbles may be set to display on the edit region. The N number of text segments are displayed in each bubble one by one. Of course, in the specific implementation process, the bubbles can be replaced by blocks or shadow regions, which are not limited herein. For example, as shown in FIG. 2, after the text-to-be-edited "厉害 了我的哥 (My brother is awesome)" is divided into four text segments, the blocks are used to display separately four text segments.

④ Displaying separately the N number of text segments in different rows. For example, each text segment is displayed in one row, and different text segments are displayed in the different rows, thereby displaying separately the N number of text segments.

Of course, the methods for displaying separately the N number of text segments are not limited to the above four methods. Based on different needs, different separated display modes may be set. It may also be preset for the user to customize the separated display mode.

Step S104: After receiving an editing operation with respect to the N number of text segments, editing the N number of text segments based on the editing operation.

In one embodiment of the present disclosure, the editing operation with respect to the N number of text segments may be an operation applied directly on a target text segment among the N number of text segments, for example, a click operation, a drag operation, a long-press operation, and other operations that are acted on one or more text segments among the N number of text segments. The operation may also be an operation applied on objects associated with the N number of text segments, for example, a click operation, a drag operation, a press operation, and other operations that are acted on replacement text segments generated based on the N number of text segments, which are not limited herein.

Further, when the editing operation is the operation applied on the target text segment among the N number of text segments, the operation that edits the N number of text segments may be an operation that directly edits the target text segments or an operation that edits the text segments corresponding to the target text segment, e.g., performing an adding-new edit on a corresponding position of the target text segment.

In the specific implementation process, the text editing often includes modify, delete, move, and add. In order to avoid confusion in text editing, it is necessary to set different editing operations for different edit types to distinguish them. For example, the editing operation corresponding to modify is set as a single click operation; the editing operation corresponding to delete is set as an operation that drags to a preset region; the editing operation corresponding to move is set as a drag operation; and the editing operation corresponding to add is set as a drag operation of multi-touch points. For another example, the editing operation corresponding to modify is set as a long-press operation; the editing operation corresponding to delete is set as a double click operation; the editing operation corresponding to move is set as a multiple click operation; and the editing operation corresponding to add is set as a swipe operation. Of course, in the specific implementation process, based on user habits or application interface layout, different editing operations may be set according to different edit types, which are not limited herein.

Next, the editing operations corresponding to modify, delete, and add on the N number of text segments are described, respectively.

First, the followings describe how to modify the N number of text segments.

Specifically, by receiving the editing operation applied on the target text segment among the N number of text segments, the target text segment that needs to be modified is confirmed. Then, based on the editing operation, text content of the target text segment is modified.

In the specific implementation process, the editing operation corresponding to modify may be a click operation that clicks the target text segment, a press operation that presses the target text segment over a predetermined period, a swipe operation that swipes in the display region of the target text segment, which is not limited herein.

Based on the editing operation, there are many methods for modifying the text content of the target text segment, including:

① Selecting the target replacement text segment from a replacement text segment set to modify the target text segment. Specifically, based on the editing operation, the replacement text segment set of the target text segment is acquired, then the replacement text segment set is displayed. After receiving a select operation that selects the target replacement text segment from the replacement text segment set, and based on the select operation, the target replacement text segment replaces the target text segment.

In the specific implementation, the replacement text segment set comprises any combination of one or more of the following: a homophone text segment with the target text segment, a text segment synonymous with the target text segment, or a text segment associated with an adjacent text segment of the target text segment.

Figure 3:
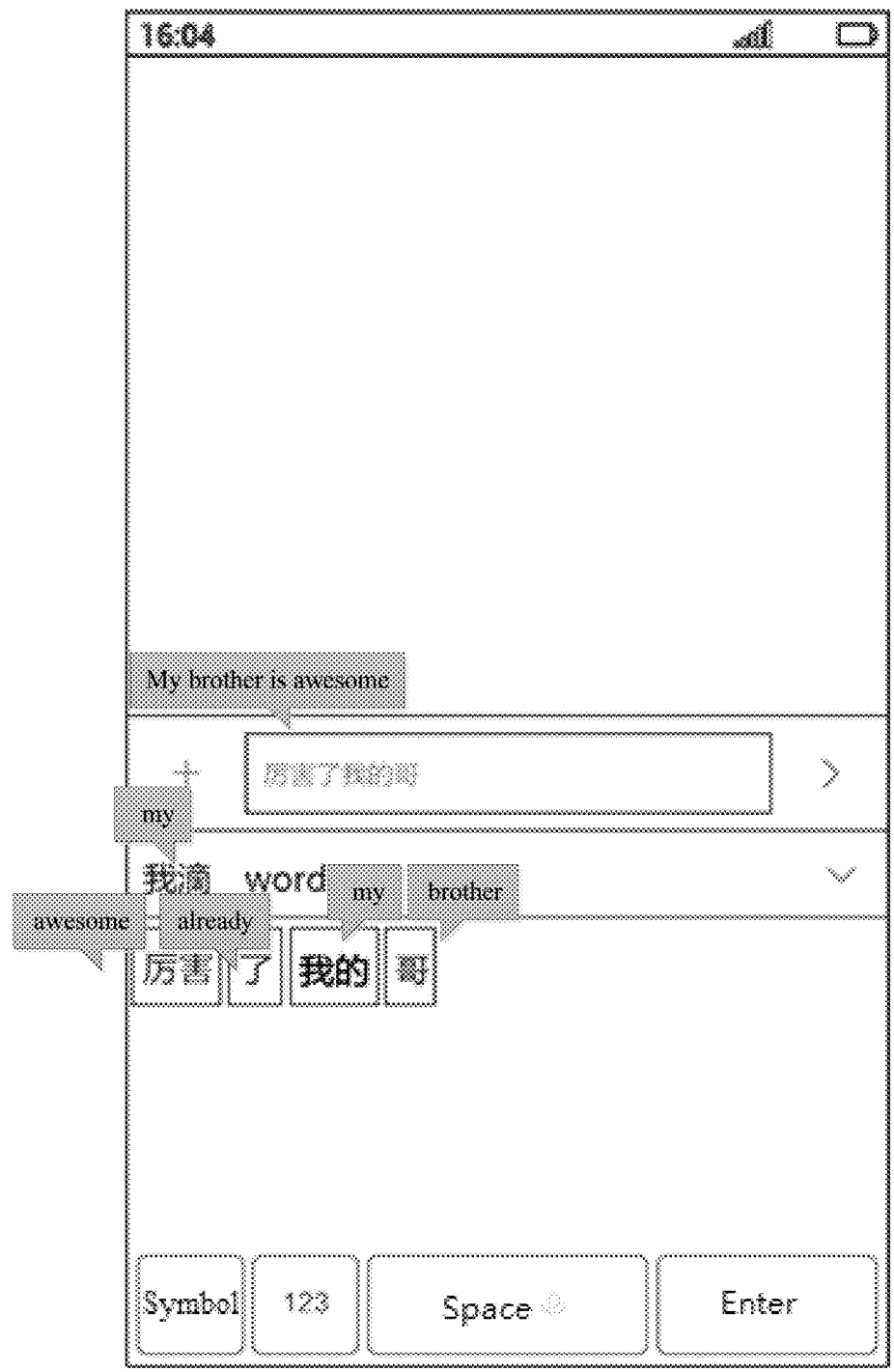
FIG. 3 illustrates a second schematic view of a text editing method according to an embodiment of the present disclosure.
Figure 4:
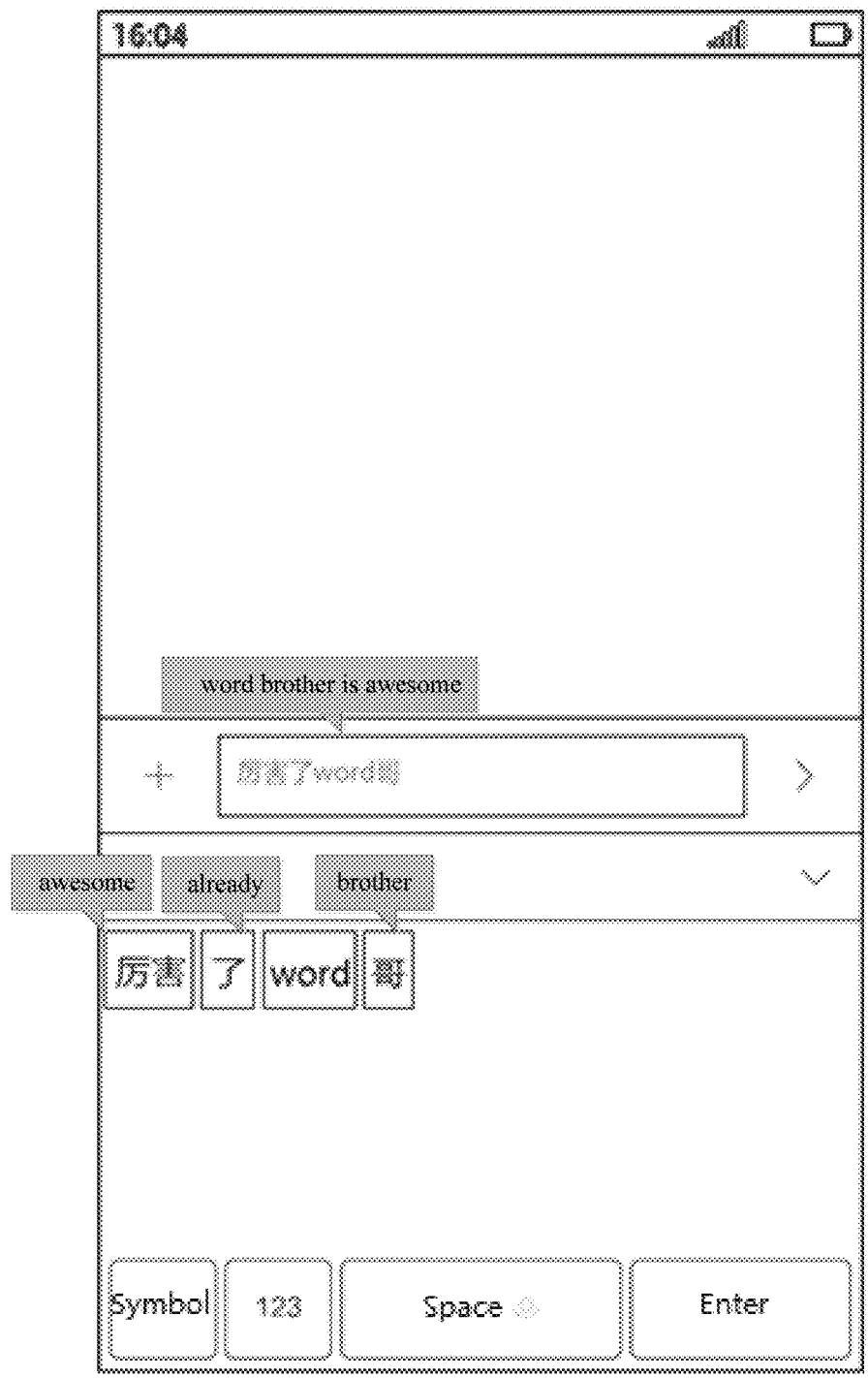
FIG. 4 illustrates a third schematic view of a text editing method according to an embodiment of the present disclosure.

According to FIG. 3 and FIG. 4, for example, if an editing operation corresponding to modify is a single click operation, the N number of text segments are "厉害 (awesome)", "了 (already)", "我的 (my)", and "哥 (brother)" in order. When receiving an editing operation that clicks "我的 (my)" from a user, as shown in FIG. 3, the replacement text segment set {"我的 (my)", "word"} of "我的 (my)" is acquired and displayed, and the user selects the "word" in the replacement text segment set. As shown in FIG. 4, based on the select operation, "我的 (my)" is replaced by "word".

For another example, the N number of text segments are "Look at", "this", "dog", ",", "it's", "too" and "big" in order. When receiving an editing operation that clicks "big" from a user, the replacement text segment set {"small", "strong", "large", "old"} of "big" is acquired and displayed, and the user selects the "strong" in the replacement text segment set. Based on the select operation, "big" is replaced by "strong".

② Inputting manually to modify the target text segment. Specifically, based on the editing operation, the target text segment is switched to a content edit mode. After receiving input information entered by a user, based on the input information, the target text segment is modified.

For example, if an editing operation corresponding to modify is a long-press operation, the N number of text segments are "明天 (tomorrow)", "中午 (noon)", "去 (go)", "吃 (eat)", "什么 (what)", and "?" in order. When receiving an editing operation that long presses "中午 (noon)" from a user, "中午 (noon)" text segment is switched to a content edit mode. The user enters input information "晚上 (evening)". Based on the input information, "中午 (noon)" is replaced by "晚上 (evening)".

For another example, the N number of text segments are: "Look at", "this", "dog", ",", "it's", "too" and "big" in order. When receiving an editing operation that long presses "big" from a user, "big" text segment is switched to a content edit mode. The user enters input information "strong". Based on the input information, "big" is replaced by "strong".

Of course, in the specific implementation process, the above two methods for modifying the text content of the target text segment may be set in the input method application for the user to select them. If the user selects the target replacement text segment in the replacement text segment set, the target replacement text segment replaces the target text segment. If the user enters the input information, based on the input information, the target text segment is modified.

Next, the followings describe how to delete the N number of text segments.

By receiving an editing operation applied on the target text segment among the N number of text segments, the target text segment that needs to be deleted is confirmed. Then, based on the editing operation, the target text segment is deleted.

Based on needs, the editing operation corresponding to delete may be set. Preferably, the editing operation may be set as an operation that moves the target text segment to a preset delete region, or an operation that drags the target text segment. For example, the preset delete region may be a region other than the edit region or a region with a preset delete icon (e.g., a trash can icon), which is not limited herein.

Of course, the editing operation corresponding to delete may also be set as a click operation that clicks the target text segment, a press operation that presses the target text segment over a predetermined period, a stereo touch control operation containing pressure information and/or contact area information, or a swipe operation that swipes in the display region of the target text segment, which is not limited herein.

It is assumed that the editing operation corresponding to delete is the operation that moves the target text segment to a region outside the edit region. The N number of text segments are "读书 (reading)", "最 (the most)", "忌讳 (taboo)", and "走马观花 (gain a superficial understanding through cursory observation)" in order. When a user needs to delete "最 (the most)", the use may click the "最 (the most)" text segment and drag it to the region outside the edit region, and then release the "最 (the most)" text segment. Based on the editing operation, the "最 (the most)" text segment is deleted.

For another example, it is assumed that the editing operation corresponding to delete is the operation that moves the target text segment to a preset delete region with a trash can icon. The N number of text segments are "Look at", "this", "dog", ",", "it's", "too", and "big" in order. When a user needs to delete "too", the use may click and select the "too" text segment and drag it to the region with the trash can icon, and then release the "too" text segment, so that the electronic apparatus deletes the "too" text segment based on the editing operation.

Further, the followings describe how to perform the operation that moves the N number of text segments.

Specifically, by receiving the editing operation applied on the target text segment among the N number of text segments, the target text segment that needs to be moved is confirmed. Then, based on the editing operation, a position of the target text segment among the N number of text segments is changed.

In the specific implementation process, based on needs, the editing operation corresponding to move may be set. For example, the editing operation corresponding to move may be set as an editing operation that clicks and drags the target text segment to a first position, where the first position is a position that the target text segment needs to be moved to. The editing operation corresponding to move may also be set as an operation that clicks firstly the target text segment and then clicks a first position, where the first position is a position that the target text segment needs to be moved to, which is not limited herein.

For example, it is assumed that the editing operation corresponding to move is an operation that clicks and drags the target text segment to the first position, and the N number of text segments are "明天 (tomorrow)", "吃 (eat)", "中午 (noon)", "去 (go)", "什么 (what)", and "?" in order. When a user needs to move the "吃 (eat)" text segment, the user may click and select the "吃 (eat)" text segment and drag it to a position between the "去 (go)" text segment and the "什么 (what)" text segment, and then release the "吃 (eat)" text segment. Based on the editing operation, the "吃 (eat)" text segment is moved to the position between the "去 (go)" text segment and the "什么 (what)" text segment. After the move operation, the N number of text segments are "明天 (tomorrow)", "中午f (noon)", "去 (go)", "吃 (eat)", "什么 (what)", and "?".

For another example, it is assumed that the editing operation corresponding to move is the operation that clicks firstly the target text segment and then clicks a first position. The N number of text segments are "Look at", ",", "this", "dog", "it's", "too", and "big" in order. When a user needs to move the "," text segment, the use may click the "," text segment, and then click a position between the "dog" text segment and the "it's" text segment. Based on the editing operation, the "," text segment is moved to the position between the "dog" text segment and the "it's" text segment. After the move operation, the N number of text segments are "Look at", "this", "dog", ",", "it's", "too", and "big".

Further, the followings describe how to perform an adding-new operation on the N number of text segments.

Specifically, by receiving the editing operation applied on the target text segment among the N number of text segments, a position of the adding-new text segment is confirmed. Then, based on the editing operation, the adding-new text segment is added to the position corresponding to the target text segment.

In the specific implementation process, based on needs, the editing operation corresponding to the adding-new operation may be set. For example, when the editing operation corresponding to the adding-new operation is set as an operation that clicks two neighboring text segments, the adding-new text segment is added to the position between the two neighboring text segments. When the editing operation corresponding to the adding-new operation is set as an operation that clicks a single text segment, the adding-new text segment is added to a position before or after the text segment. When the editing operation corresponding to the adding-new operation is set as an operation that drags two neighboring text segments in opposite directions, the adding-new text segment is added to a position between the two dragged neighboring text segments.

After determining the position of the text segment that needs to be added, there are many methods for determining the content of the adding-new text segment:

①Selecting the target adding-new text segment from an adding-new text segment set. Specifically, in the beginning, based on the position of the target text segment and the N number of text segments, the adding-new text segment set is acquired and displayed, and then a select operation that selects the target adding-new text segment from the adding-new text segment set is received. Based on the select operation, the target adding-new text segment is added to the corresponding position of the target text segment.

In the specific implementation, the adding-new text segment set includes any combination of one or more of the following: pre-counted common words, common punctuation marks, or associated text segments acquired by analyzing the position where the adding-new text segment needs to be added and the N number of text segments.

Figure 5:
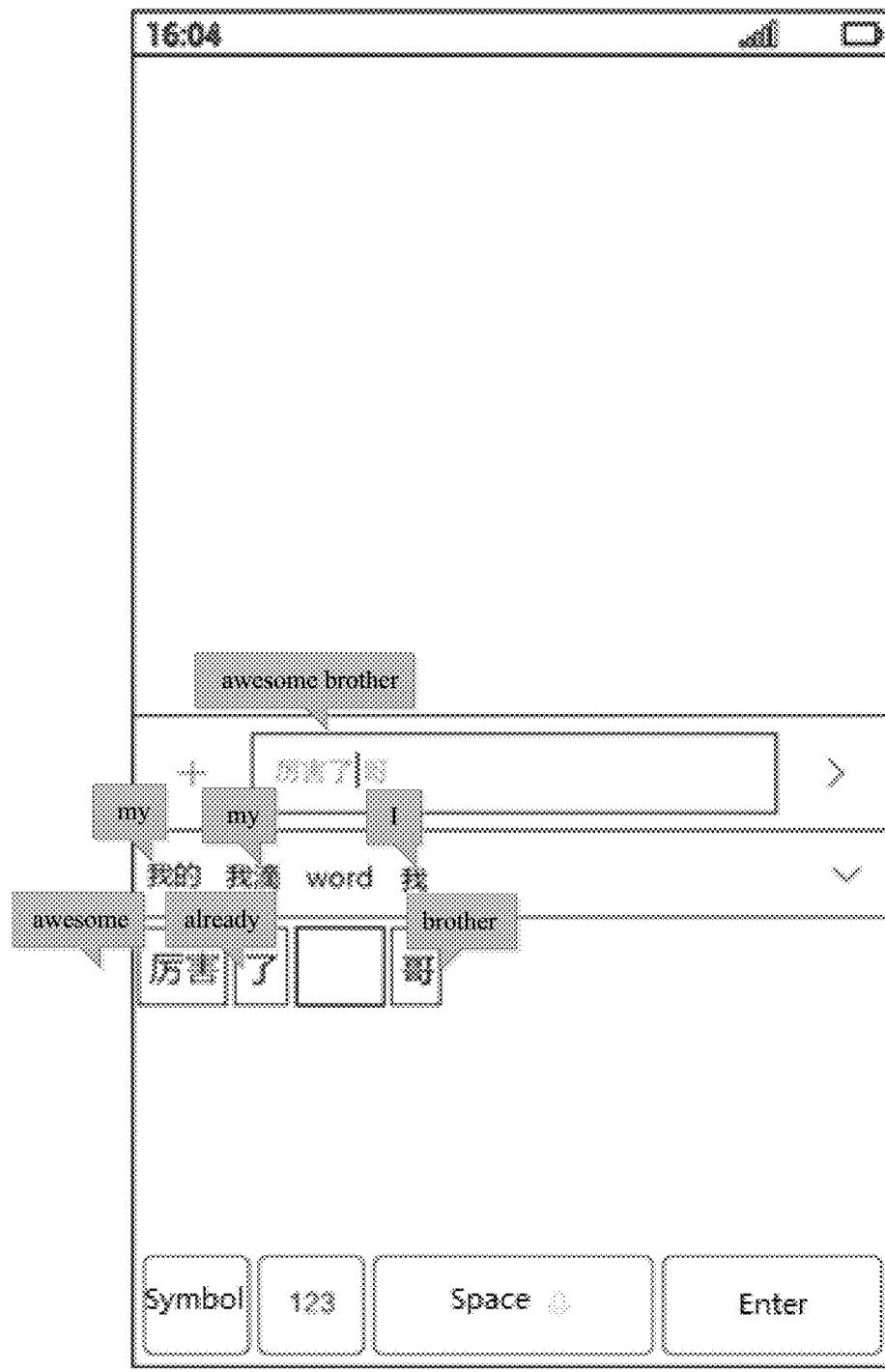
FIG. 5 illustrates a fourth schematic view of a text editing method according to an embodiment of the present disclosure.
Figure 6:
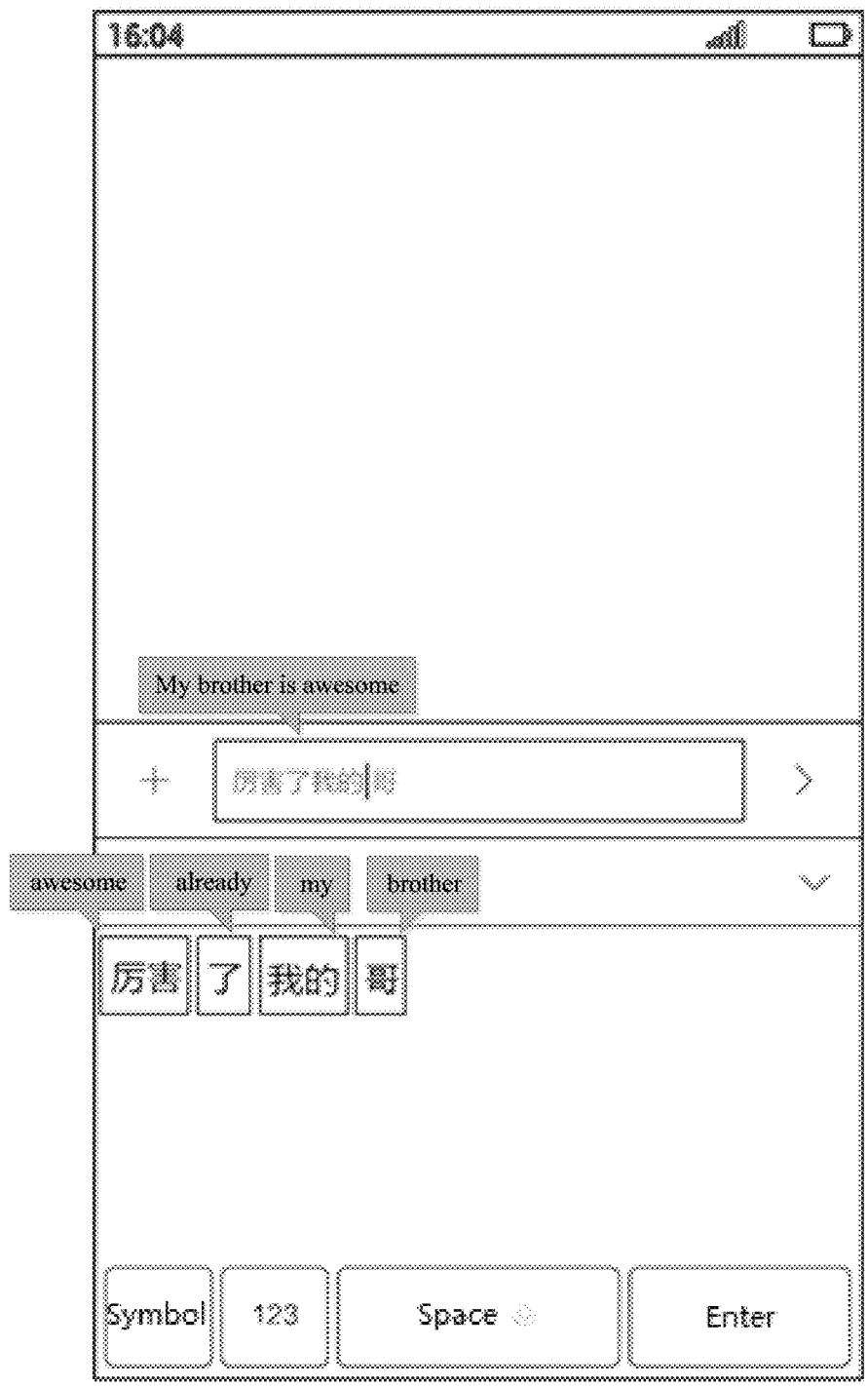
FIG. 6 illustrates a fifth schematic view of a text editing method according to an embodiment of the present disclosure.

According to FIG. 5 and FIG. 6, for example, it is assumed that the editing operation corresponding to the adding-new operation is an operation that drags two neighboring text segments in opposite directions, and the N number of text segments are "厉害 (awesome)", "了 (already)", and "哥 (brother)" in order. When receiving an editing operation that drags the "了 (already)" text segment and the "哥 (brother)" text segment in opposite directions from a user, as shown in FIG. 5, a blank text segment is added between the "了 (already)" text segment and the "哥 (brother)" text segment. Then, by performing semantic analysis on "厉害 (awesome)", "了 (already)", and "哥 (brother)", the associated text segments "我的 (my)", "我滴 (my)", "word", and "我 (I)" that are suitable to be added between the "了 (already)" text segment and the "哥 (brother)" text segment are acquired. Further, the acquired associated text segments are displayed in the adding-new text segment set {"我的 (my)", "我滴 (my)", "word", and "我 (I)"}. The user selects "我的 (my)" from the adding-new text segment set. Based on the select operation, the "我的 (my)" text segment is newly added between the "了 (already)" text segment and the "哥 (brother)" text segment. As shown in FIG. 6, after the adding-new operation, the adding-new N number of text segments are "厉害 (awesome)", "了 (already)", "我的 (my)", and "哥 (brother)" in order.

For another example, it is assumed that the editing operation corresponding to the adding-new operation is an operation that clicks two neighboring text segments, and the N number of text segments are "Look at", "dog", ",", "it's", "too" and "big" in order. When receiving an editing operation that clicks the "Look at" text segment and the "dog" text segment from a user, the adding-new text segment set {"the", "a", "that", "this"} is acquired and displayed. The user selects "that" from the adding-new text segment set. Based on the select operation, the "that" text segment is newly added between the "Look at" text segment and the "dog" text segment. After the adding-new operation, the N number of text segments are "Look at", "that", "dog", ",", "it's", "too" and "big".

②Adding the adding-new text segment by entering manually. Specifically, that is, based on the editing operation, input information entered by the user is received. Then, based on the input information, the adding-new text segment is added to the position corresponding to the target text segment.

It is assumed that the editing operation corresponding to the adding-new operation is an operation that clicks two neighboring text segments, and the N number of text segments are "明天 (tomorrow)", "中午 (noon)", "去 (go)", "什么 (what)", and "?" in order. When receiving an editing operation that clicks the "去 (go)" text segment and the "什么 (what)" text segment from a user, a blank text segment is generated between the "去 (go)" text segment and the "什么 (what)" text segment. The user may enter input information "吃 (eat)" by using a keyboard or a touch screen. Based on the input information, the "吃 (eat)" text segment is added between the "去 (go)" text segment and the "什么 (what)" text segment. After the adding-new operation, the adding-new N number of text segments are "明天 (tomorrow)", "中午 (noon)", "去 (go)", "吃 (eat)", "什么 (what)", and "?".

For another example, it is assumed that the editing operation corresponding to the adding-new operation is an operation that drags two neighboring text segments in opposite directions, and the N number of text segments are "Look at", "dog", ",", "it's", "too" and "big". When receiving an editing operation that drags the "Look at" text segment and the "dog" text segment in opposite directions from a user, a blank text segment is added between the "Look at" text segment and the "dog" text segment. The user may enter input information "this" by using a keyboard or a touch screen. Based on the input information, the "this" text segment is added between the "Look at" text segment and the "dog" text segment. After the new adding operation, the adding-new N number of text segments are "Look at", "that", "dog", ",", "it's", "too" and "big".

Of course, the above two methods may be set in an input method application for the user to select. If the user selects the target adding-new text segment from the adding-new text segment set, the target adding-new text segment is added. If the user enters the input information, based on the input information, the adding-new text segment is added. The user may also select the target adding-new text segment from the adding-new text segment set at first, then the user continues to perform add, replace, delete, modify, and other editing operations on the target adding-new text segment.

In one embodiment of the present disclosure, in addition to the above common text editing modes, considering that a certain text segment unit in the text segment may need to be modified, in order to facilitate the process to further divide and modify the text segment, an editing operation corresponding to divide may be set. That is, after receiving the editing operation applied on the target text segment among the N number of text segments, the target text segment is further divided into M number of text segment units based on the editing operation, where M is a positive integer greater than 1.

It should be noted that the editing operation corresponding to divide, and the editing operation corresponding to modify, delete, add, and move need to have differentiate settings. For example, an editing operation corresponding to divide may be an operation that double-clicks the target text segment. Also, the editing operation corresponding to divide may be an operation that swipes back and forward the target text segment, which is not limited herein. However, the editing operation corresponding to the divide needs to be distinguished from other editing operations.

Figure 7:
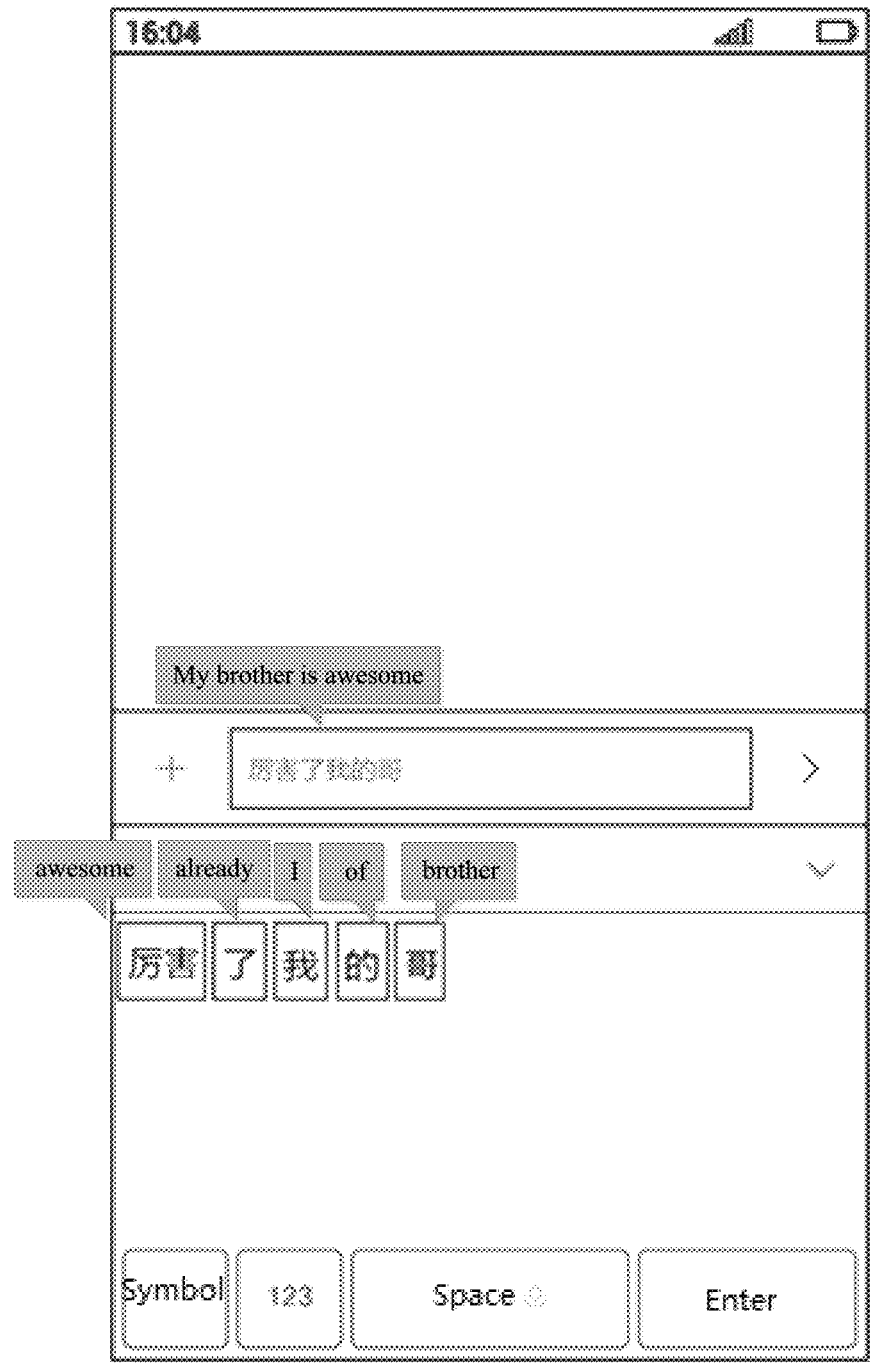
FIG. 7 illustrates a sixth schematic view of a text editing method according to an embodiment of the present disclosure.

According to FIG. 6 and FIG. 7, for example, when "我的 (my)" text segment needs to be further divided, a double click operation may be performed to the "我的 (my)" text segment, as shown in FIG. 7, the "我的 (my)" text segment is further divided into "我 (I)" and "的".

The target text segment may be further divided using characters as units. For example, the target text segment "it's" is further divided into "i", "t", "'" and "s". The target text segment may be divided in semantics. For example, the target text segment 天天向上 (make progress every day)" is further divided into the "天天 (every day)" and "向上 (make progress)".

Further, any text segment unit in the M number of text segment units may be edited by using a method for editing the text segments. That is, the divided text segment units may be performed editing operations including modify, delete, move, edit or further divide. For example, for editing the target text segment, after dividing the target text segment into a plurality of text segment units, the divided text segment unit may be also edited again to further perform the divide operation, where the divided text segment unit may be further divided based on the semantic analysis, or the divided text segment unit may be further divided based on a preset granularity from largest to smallest.

For example, the N number of text segments are "影片 《卧虎藏龙》 (The movie "Crouching Tiger, Hidden Dragon")", "is (是)", "a martial arts action film (一部武侠动作电影)". When a user double clicks "影片 《卧虎藏龙》 (The movie "Crouching Tiger, Hidden Dragon")", it is confirmed that "影片 《卧虎藏龙》 (The movie "Crouching Tiger, Hidden Dragon")" is a target text segment. Based on the double click operation, "影片 《卧虎藏龙》 (The movie "Crouching Tiger, Hidden Dragon")" is divided into two text segment units "影片 (The film)" and "《卧虎藏龙》 ("Crouching Tiger, Hidden Dragon")". Then, when the user performs a double click operation on the text segment unit "《卧虎藏龙《 ("Crouching Tiger, Hidden Dragon")", the text segment unit is further divided into "《(")", "卧虎藏龙 (Crouching Tiger, Hidden Dragon)", and"》(")". Further, when the user performs a double click operation on the text segment unit "卧虎藏龙 (Crouching Tiger, Hidden Dragon)", the text segment unit "卧虎藏龙 (Crouching Tiger, Hidden Dragon)" is further divided into two text segment units "卧虎 (Crouching Tiger)" and "藏龙 (Hidden Dragon)".

After dividing the target text segment into the M number of text segment units, in order to perform operations on text segment unit, the M number of text segment units may be separately displayed. After receiving the operation that processes the M number of text segment units, based on the processing operation, the M number of text segment units are edited. The editing method for the text segment unit is similar to the editing method for the target text segment, which is not repeated herein.

In one embodiment of the present disclosure, considering that it's inevitable to have a spelling error or a wrong word during a document editing process, in order to improve accuracy and modifying efficiency of the document editing, an auto-correction function may be set for the N number of text segments. That is, it is automatically determined whether there is a wrong text segment in the N number of text segments. When there is a wrong text segment, a replacement text segment set of the wrong text segment is acquired and displayed, such that a user can select a target replacement text segment from the replacement text segment set to replace the wrong text segment.

Specifically, a text probabilistic analysis through big data analysis or deep learning algorithms is performed to determine whether there is the wrong text segment.

Further, in order to facilitate the user to find a wrong text segment, when there is the wrong text segment in the N number of text segments, the wrong text segment is highlighted. Specific highlighting methods comprise highlight displaying the wrong text segment; displaying the wrong text segment in a warning color such as red; or blinking displaying the wrong text segment. The methods are not limited and are not enumerated herein.

For example, the N number of text segments are "读书 (reading)", "最 (the most)", "忌会", and "走马观花 (gain a superficial understanding through cursory observation)". Each text segment is performed a replacement probabilistic analysis through big data analysis, respectively. Using "忌会" as an example, in the beginning, the text segments before and after "忌会" are performed a semantic analysis to acquire "害怕 (fear)", "忌讳 (taboo)", "担心 (fear)", "喜欢 (like)", and other associated text segments. Then, the analysis combined with previous and next text segments is performed to calculate probability that each associated text segment occurs in a position of "忌会" text segment located in the N number of text segments as alternative probability of each associated text segment. After analyzing "忌会" occurrence probability of this position in the N number of text segments is lower than alternative probability of other associated text segments. Therefore, it is determined that "忌会" is a wrong text segment. "忌会" is highlighted, and the replacement text segment set {"害怕 (fear)", "忌讳 (taboo)", "担心 (fear)", "喜欢 (like)"} with the relatively high alternative probability is acquired. The user selects "忌讳 (taboo)" from the replacement text segment set. Based on the select operation, the "忌会" is modified to "忌讳 (taboo)".

For another example, the N number of text segments are "Look at", "tht", "dog", ",", "it's", "too", and "big". Based on the same analysis, after analyzing "tht", occurrence probability of "tht" in the N number of text segments is lower than alternative probability of other replacement words. Therefore, it is determined that "tht" is a wrong text segment. "tht" is highlighted, and the relatively high alternative probability of the replacement text segment set {"the", "this", "that"} is acquired. The user selects "that" from the replacement text segment set. Based on the select operation, "tht" is modified to "that".

Of course, in the specific implementation process, the user may also modify the wrong text segment by modifying the corresponding editing operation, which is not limited here. Specifically, in one embodiment of the present disclosure, the text-to-be-edited that is separated into a plurality of text segments is displayed. The user can perform delete, replace, move, modify, and other editing operations on the text segment by clicking, dragging, and others simple operations, thereby improving effectively the efficiency of text editing operations, reducing possibility of mis-operations, and improving the user experience.

Based on a same inventive concept, one embodiment of the present disclosure also provides a text editing method according to a second embodiment.

Second Embodiment

Figure 8:
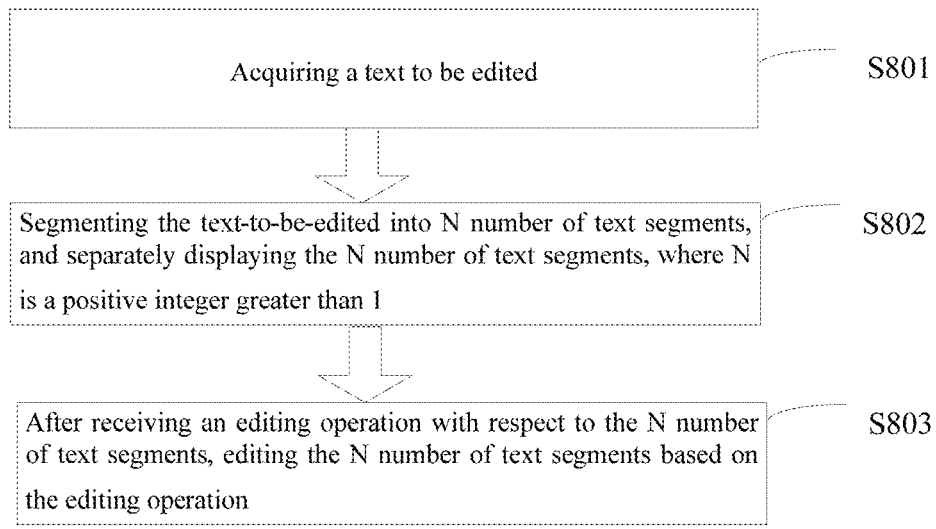
FIG. 8 illustrates a second flowchart of a text editing method according to an embodiment of the present disclosure.

One embodiment of the present disclosure provides a text editing method which is applied to an input method. As shown in FIG. 8, the method may include the following steps:

Step S801: Acquiring a text-to-be-edited.

Step S802: Segmenting the text-to-be-edited into N number of text segments, and separately displaying the N number of text segments, where N is a positive integer greater than 1.

Step S803: After receiving an editing operation with respect to the N number of text segments, editing the N number of text segments based on the editing operation.

The text editing method provided in the present embodiment is applied to the input method application. Before Step S802, in the beginning, based on a received trigger operation, an edit region is generated. Then, the N number of text segments are separately displayed in the edit region. Alternatively, after acquiring the text-to-be-edited, without the need to receive the trigger operation, the N number of text segments are displayed separately and automatically in the input method.

The specific implementation steps in the method provided in one embodiment of the present disclosure is similar to the specific implementation steps in the method introduced in the first embodiment of the present disclosure, and those skilled in the art can know the specific implementation steps based on the text editing method introduced in the first embodiment of the present disclosure, so that the device will not be elaborated herein.

Based on a same inventive concept, one embodiment of the present disclosure also provides a device according to the text editing method in the first embodiment.

Third Embodiment

Figure 9:
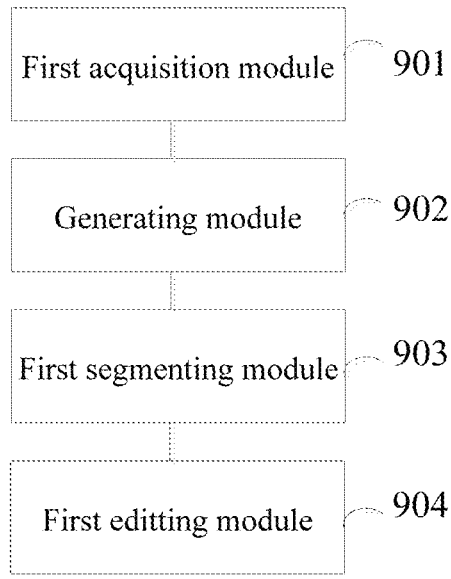
FIG. 9 illustrates a first structural schematic view of a text editing device according to an embodiment of the present disclosure.

One embodiment of the present disclosure provides a text editing device. As shown in FIG. 9, the device may include:

A first acquisition module 901 that is configured to acquire a text-to-be-edited;

A generating module 902 that is configured to, after receiving a trigger operation, generate an edit region;

A first segmenting module 903 that is configured to segment the text-to-be-edited into N number of text segments, and separately display the N number of text segments in the edit region, where N is a positive integer greater than 1; and A first editing module 904 that is configured to, after receiving an editing operation with respect to the N number of text segments, edit the N number of text segments based on the editing operation.

Optionally, the first editing module 904 is also configured to:

after receiving the editing operation applied on a target text segment among the N number of text segments, edit the target text segment based on the editing operation; or after receiving the editing operation applied on the target text segment among the N number of text segments, edit the text segment corresponding to the target text segment based on the editing operation.

Optionally, the text-to-be-edited may comprise the text-to-be-edited entered by a user; the text-to-be-edited acquired from a clipboard; or the text-to-be-edited received through a network.

Optionally, the trigger operation may comprise the trigger operation applied on a preset region on a current interface; the trigger operation used to move a cursor; a swipe operation applied on the current interface; and a shaking operation that shakes the device.

Optionally, the first segmenting module 903 is also configured to:

segment the text-to-be-edited into the N number of text segments based on an on-screen sequence of the text-to-be-edited; or segment the text-to-be-edited into the N number of text segments based on semantic analysis of the text-to-be-edited.

Optionally, the device may also comprise:

A first determining module that is configured to determine whether there is a wrong text segment in the N number of text segments.

A highlighting module that is configured to highlight the wrong text segment when there is the wrong text segment in the N number of text segments.

Optionally, the device may also comprise a second determining module that is configured to determine whether there is a wrong text segment in the N number of text segments; and acquire and display a replacement text segment set of the wrong text segment when there is the wrong text segment in the N number of text segments.

The first editing module 904 is also configured to: receive a select operation that selects the target replacement text segment from the replacement text segment set; and based on the select operation, replace the wrong text segment by the target replacement text segment.

Optionally, the first editing module 904 is also configured to: receive the editing operation applied on the target text segment among the N number of text segments; modify the text content of the target text segment based on the editing operation; or, delete the target text segment based on the editing operation; or, change a position of the target text segment among the N number of text segments based on the editing operation; or determine a target position and add the adding-new text segment to the target position based on the editing operation; or, divide the target text segment into M number of text segment units based on the editing operation, where M is a positive integer greater than 1; and after receiving the editing operation applied on the target text segment unit of the M number of text segment units, the target text segment unit is used as the target text segment.

Optionally, the first editing module 904 is also configured to, based on the editing operation, acquire the replacement text segment set of the target text segment; display the replacement text segment set; receive a select operation that selects the target replacement text segment from the replacement text segment set; and based on the select operation, replace the target text segment by the target replacement text segment.

Optionally, the first editing module 904 is also configured to, based on the editing operation, switch the target text segment to a content edit mode; receive input information entered by a user; and based on the input information, modify the target text segment.

Optionally, the first editing module 904 is also configured to, when the editing operation is a click operation that clicks the target text segment, modify the text content of the target text segment; or, when the editing operation is a press operation that presses the target text segment over a predetermined period, modify the text content of the target text segment; or, when the editing operation is a swipe operation that swipes in the display region of the target text segment, modify the text content of the target text segment.

Optionally, the first editing module 904 is also configured to, when the editing operation is an operation that moves the target text segment to a preset delete region, delete the target text segment; or, when the editing operation is an operation that drags the target text segment, delete the target text segment; or, when the editing operation is an operation that multiple clicks the target text segment, delete the target text segment; or, when the editing operation is an operation that swipes back and forward in the display region of the target text segment, delete the target text segment.

Optionally, when the target text segment is two neighboring text segments, the target position may comprise a position between the two text segments.

When the target text segment is a single text segment, the target position may comprise a neighboring position of the target text segment.

Optionally, the first editing module 904 is also configured to: based on the target position and the N number of text segments, acquire an adding-new text segment set; display the adding-new text segment set; receive a select operation that selects the target adding-new text segment from the adding-new text segment set; and based on the select operation, add the target adding-new text segment to the target position.

Optionally, the first editing module 904 is also configured to: receive the input information entered by the user; and based on the input information, add the adding-new text segment to the target position.

Optionally, the first editing module 904 is also configured to, when the editing operation is a dragging operation that drags the target text segment, determine that a corresponding position of the target text segment is the target position; or, when the editing operation is a click operation that clicks the target text segment, determine that a corresponding position of the target text segment is the target position; or, when the editing operation is a dragging operation that drags two neighboring text segments in opposite directions, determine that a position between the two neighboring text segments is the target position.

Optionally, the first editing module 904 is also configured to: based on the editing operation, divide the target text segment into M number of text segment units in characters; display separately the M number of text segment units; and after receiving a processing operation that processes the M number of text segment units, based on the processing operation, edit the M number of text segment units.

Optionally, the first editing module 904 is also configured to: when the editing operation is an operation that multiple clicks the target text segment, divide the target text segment into the M number of text segment units; or, when the editing operation is an operation that swipes back and forward in the display region of the target text segment, divide the target text segment into the M number of text segment units.

The device introduced in the third embodiment of the present disclosure may be the device adopted for the text editing method introduced in the first embodiment of the present disclosure, and those skilled in the art can know the specific structure and transformation of the device based on the text editing method introduced in the first embodiment of the present disclosure, so that the device will not be elaborated herein.

Based on a same inventive concept, one embodiment of the present disclosure also provides a device according to the method in the second embodiment.

Fourth Embodiment

Figure 10:
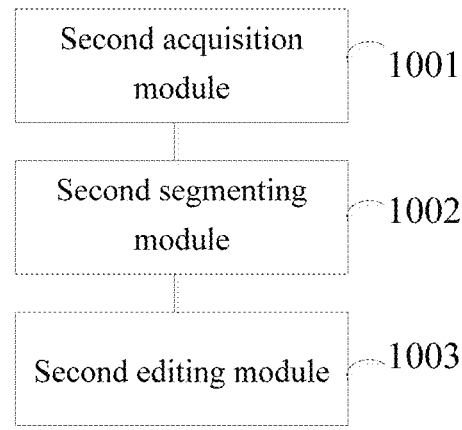
FIG. 10 illustrates a second structural schematic view of a text editing device according to an embodiment of the present disclosure.

One embodiment of the present disclosure provides a text editing device which an input method application is installed in. As shown in FIG. 10, the device includes:

A second acquisition module 1001 that is configured to acquire a text-to-be-edited in the input method application;

A second segmenting module 1002 that is configured to segment the text-to-be-edited into N number of text segments, and separately display the N number of text segments in the input method application, where N is a positive integer greater than 1; and A second editing module 1003 that is configured to, after receiving an editing operation with respect to the N number of text segments, edit the N number of text segments based on the editing operation in the input method application.

The device introduced in the fourth embodiment of the present disclosure may be the device adopted for the text editing method introduced in the second embodiment of the present disclosure, and those skilled in the art can know the specific structure and transformation of the device based on the text editing method introduced in the second embodiment of the present disclosure, so that the device will not be elaborated herein.

Based on a same inventive concept, one embodiment of the present disclosure also provides an electronic apparatus according to the method in the first embodiment.

Fifth Embodiment

One embodiment of the present disclosure provides a text editing apparatus, including: a memory, and one or more programs, where the one or more programs are stored in the memory; after configuration, one or more processors configured to execute the following operational instructions included in one or more programs: acquiring a text-to-be-edited; after receiving a trigger operation, generating an edit region; segmenting the text-to-be-edited into N number of text segments, and separately displaying the N number of text segments in the edit region, where N is a positive integer greater than 1; and after receiving an editing operation with respect to the N number of text segments, editing the N number of text segments based on the editing operation.

The electronic apparatus introduced in the fifth embodiment of the present disclosure may be the apparatus adopted for the text editing method introduced in the first embodiment of the present disclosure, and those skilled in the art can know the specific structure and transformation of the apparatus based on the text editing method introduced in the first embodiment of the present disclosure, so that the electronic apparatus will not be elaborated herein.

Based on a same inventive concept, one embodiment of the present disclosure also provides an electronic apparatus according to the text editing method introduced in the second embodiment of the present disclosure. The details are described in a sixth embodiment.

Sixth Embodiment

One embodiment of the present disclosure provides a text editing apparatus, including: a memory, and one or more programs, where the one or more programs are stored in the memory; after configuration, one or more processors configured to execute the following operational instructions included in one or more programs: acquiring a text-to-be-edited in an input method application; in the input method application, segmenting the text-to-be-edited into N number of text segments, and separately displaying the N number of text segments, where N is a positive integer greater than 1; and in the input method application, after receiving an editing operation with respect to the N number of text segments, editing the N number of text segments based on the editing operation.

The electronic apparatus introduced in the sixth embodiment of the present disclosure may be the electronic apparatus adopted for the text editing method introduced in the second embodiment of the present disclosure, and those skilled in the art can know the specific structure and transformation of the apparatus based on the text editing method introduced in the second embodiment of the present disclosure, so that the electronic apparatus will not be elaborated herein.

With regard to the device and the electronic apparatus in the above embodiment, detailed description of specific manner for performing operation of modules has been made in the embodiment related to the method, and no detailed illustration will be made herein.

Figure 11:
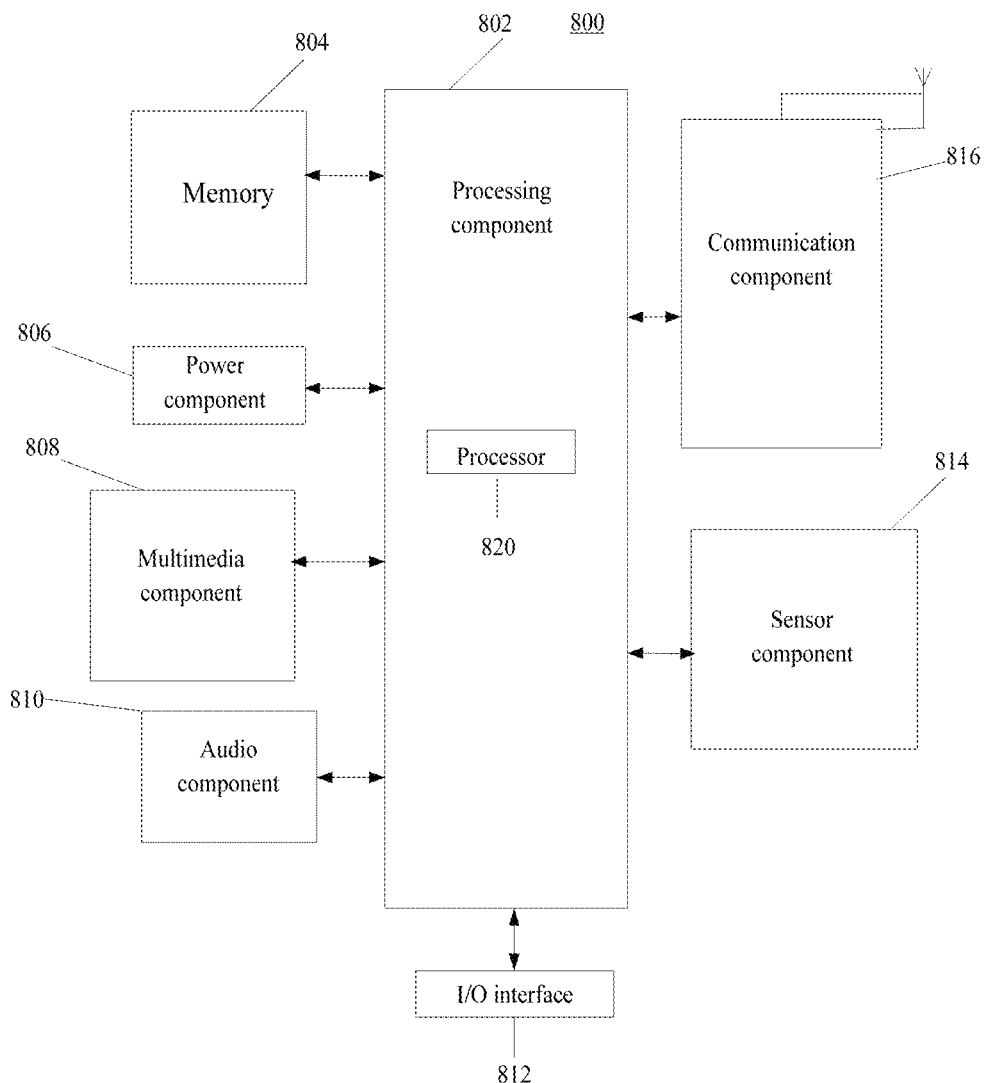
FIG. 11 illustrates a block diagram of a text editing electronic apparatus 800 according to the present disclosure.

FIG. 11 illustrates a block diagram of a text editing electronic apparatus 800 according to the present disclosure. For example, the electronic apparatus 800 may be a mobile phone, a computer, a digital broadcast terminal, a messaging device, a game console, a tablet computer, a medical equipment, a fitness equipment, a personal digital assistant and so on.

Referring to FIG. 11, the electronic apparatus 800 may include one or more of the following components: a processing component 802, a memory 804, a power component 806, a multimedia component 808, an audio component 810, an input/output (I/O) interface 812, a sensor component 814, and a communication component 816.

The processing component 802 may control overall operations of the electronic apparatus 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 may be configured to store various types of data to support the operation of the electronic apparatus 800. Examples of such data include instructions for any applications or methods operated on the electronic apparatus 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the electronic apparatus 800. The power component 806 may include a power management system, one or more power sources, and any other components associated with the generation, management, and distribution of power for the electronic apparatus 800.

The multimedia component 808 may include a display screen providing an output interface between the electronic apparatus 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia data while the electronic apparatus 800 is in an operation mode, such as a photographing mode or a video mode. Each of the front camera and the rear camera may be a fixed optical lens system or have optical focusing and zooming capability.

The audio component 810 may be configured to output and/or input audio signals. For example, the audio component 810 may include a microphone (MIC) configured to receive an external audio signal when the electronic apparatus 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, the peripheral interface modules being, for example, a keyboard, a click wheel, buttons, and the like. The buttons may include, but are not limited to, a home button, a volume button, a starting button, and a locking button.

The sensor component 814 includes one or more sensors to provide status assessments of various aspects of the electronic apparatus 800. For instance, the sensor component 814 may detect an open/closed status of the electronic apparatus 800, relative positioning of components (e.g., the display and the keypad, of the electronic apparatus 800), a change in position of the electronic apparatus 800 or a component of the electronic apparatus 800, a presence or absence of user contact with the electronic apparatus 800, an orientation or an acceleration/deceleration of the electronic apparatus 800, and a change in temperature of the electronic apparatus 800. The sensor component 814 may include a proximity sensor configured to detect the presence of a nearby object without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor or thermometer.

The communication component 816 may be configured to facilitate communication, wired or wirelessly, between the electronic apparatus 800 and other apparatus. The electronic apparatus 800 can access a wireless network based on a communication standard, such as Wi-Fi, 2G, 3G, or a combination thereof. In an exemplary embodiment, the communication component 816 receives a broadcast signal or broadcast associated information from an external broadcast management system via a broadcast channel. In an exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the electronic apparatus 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 804, executable by the processor 820 in the electronic apparatus 800, for performing the above-described methods. For example, the non-transitory computer-readable storage medium may be a ROM, a RAM, a CD-ROM, a magnetic tape, a floppy disc, an optical data storage device, and the like.

A non-transitory computer readable storage medium may be provided, the storage medium storing instructions which executed by the processor of the mobile terminal, cause the mobile terminal to perform one or more text editing methods in FIG. 1-8.

A non-transitory computer readable storage medium may be provided, the storage medium storing instructions which executed by the processor of the mobile terminal, cause the mobile terminal to perform one text editing method. The method includes: acquiring a text-to-be-edited; after receiving a trigger operation, generating an edit region; segmenting the text-to-be-edited into N number of text segments, and separately displaying the N number of text segments in the edit region, where N is a positive integer greater than 1; and after receiving an editing operation with respect to the N number of text segments, editing the N number of text segments based on the editing operation.

A non-transitory computer readable storage medium may be provided, the storage medium storing instructions which executed by the processor of the electronic apparatus, cause the mobile terminal to perform one text editing method. The method includes: acquiring a text-to-be-edited; segmenting the text-to-be-edited into N number of text segments, and separately displaying the N number of text segments, where N is a positive integer greater than 1; and after receiving an editing operation with respect to the N number of text segments, editing the N number of text segments based on the editing operation.

Figure 12:
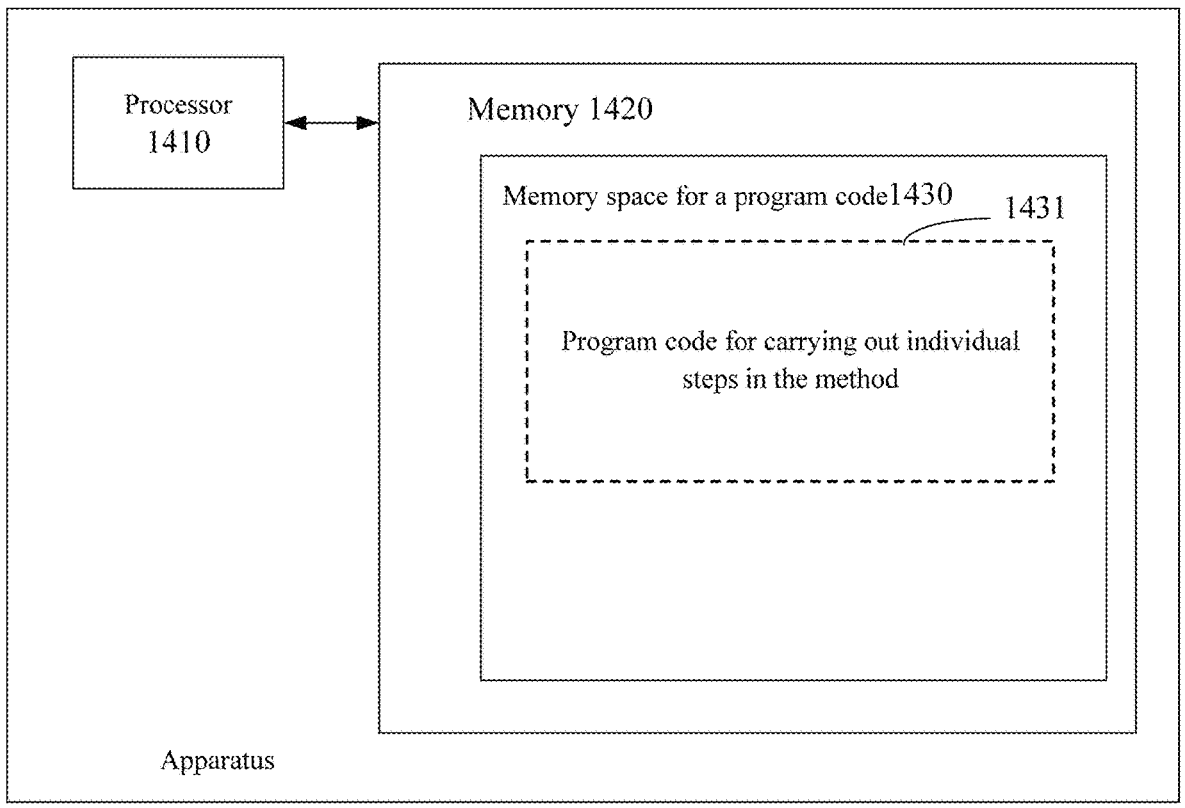
FIG. 12 illustrates a block diagram of an apparatus for performing a text editing method according to the present disclosure.
Figure 13:
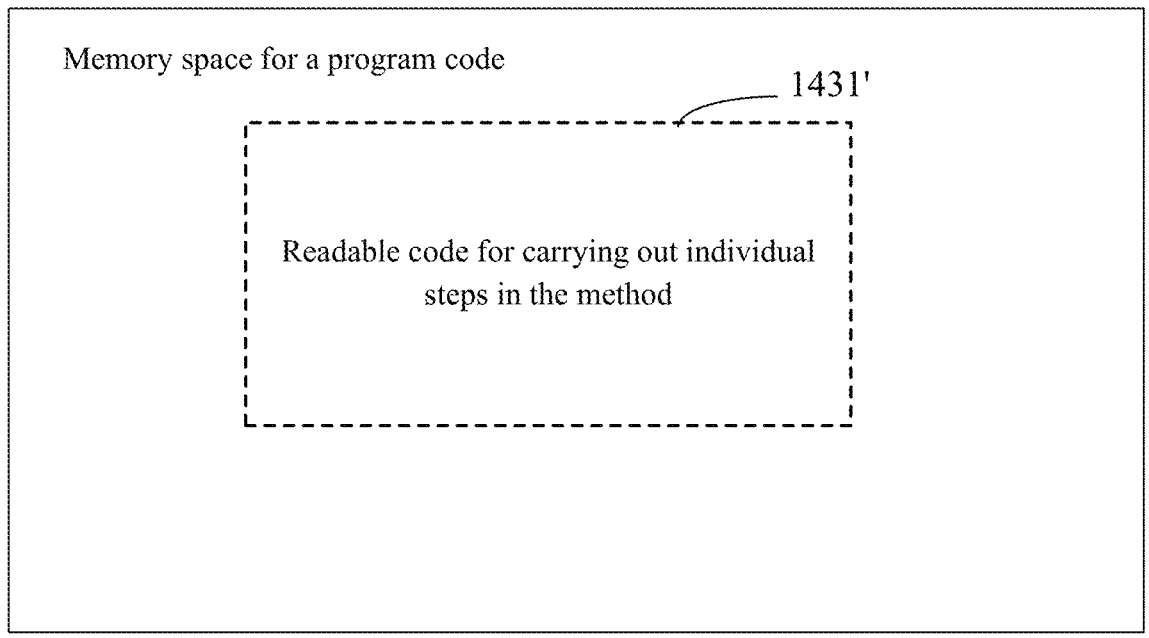
FIG. 13 illustrates a storage unit for storing or carrying program codes that implement a text editing method according to the present disclosure.

FIG. 12 illustrates a block diagram of an apparatus for performing a text editing method according to the present disclosure. The apparatus may be an electronic apparatus or a server. The apparatus traditionally includes a processor 1410 and a computer program product or a computer readable medium in the form of a memory 1420. The memory 1420 may be an electronic memory such as a flash memory, an EEPROM (electrically erasable programmable read-only memory), an EPROM (erasable programmable ROM), a hard disk or a ROM. The memory 1420 has a memory space 1430 for a program code 1431 for carrying out any method steps in the methods as described above. For example, the memory space 1430 for a program code may comprise individual program codes 1431 for carrying out individual steps in the above methods, respectively. The program codes may be read out from or written to one or more computer program products. These computer program products comprise such a program code carrier as a hard disk, a compact disk (CD), a memory card or a floppy disk. Such a computer program product is generally a portable or stationary storage unit as described with reference to FIG. 13. The storage unit may have a memory segment, a memory space, etc. arranged similarly to the memory 1420 in the computing device of FIG. 12. The program code may for example be compressed in an appropriate form. In general, the storage unit comprises a computer readable code 1431', i.e., a code which may be read by e.g., a processor such as 1410, and when run by a computing device, the codes cause the computing device to carry out individual steps in the methods described above.

Other embodiments of the disclosure will be apparent to those skilled in the art from consideration of the specification and practice of the embodiments disclosed herein. The present disclosure is intended to cover any variations, uses, or adaptations of the disclosure following the general principles thereof and including such departures from the present disclosure as come within known or customary practice in the art. It is intended that the specification and examples are considered as exemplary only, with a true scope and spirit of the invention being indicated by the following claims in addition to the disclosure.

It should be understood that the disclosure is not limited to the precise construction as described above and shown in the figures, but can have various modification and alternatives without departing from the scope of the disclosure. The scope of the disclosure is limited only by the appended claims.

The aforementioned examples are just preferred examples of the present disclosure, and are not intended to limit the present disclosure. Any modifications, equivalent substitutions and improvements made under the spirits and principles of the present disclosure are intended to fall within the protection scope of the present disclosure.

The technical solutions in the embodiments of the present disclosure at least have the following technical effects or advantages: after receiving a trigger operation, segmenting a text-to-be-edited into N number of text segments, and separately displaying the N number of text segments in a generated edit region in order to save time for users to separate the text segments on their own reading way. Also, the users can be set up to directly edit the N number of text segments. The users do not need to find out and select the text segment to be edited by themselves from a consecutive text segment, reducing complexity of text editing operations and improving text editing efficiency.

The present disclosure has been described with reference to flowchart illustrations and/or block diagrams of methods, apparatus (system), and computer program products according to embodiments of the present invention. It will be understood that each flow and/or each block of the flowchart illustrations and/or block diagrams, or any combination of the flows and/or blocks of the flowchart illustrations and/or block diagrams can be implemented in computer program instructions. These computer program instructions can be provided to a processor of a general-purpose computer, special purpose computer, embedded processor, or other programmable data processing apparatus to produce a machine for the execution of the instructions. With the execution by the processor of the computer or other programmable data processing apparatus, functions specified in one or more flows and/or one or more blocks of the flowchart illustrations and/or block diagrams can be implemented.

The computer program instructions can also be stored in a computer readable memory that can direct the computer or other programmable data processing apparatus to operate in a particular manner, such that the instructions stored in the computer readable memory produce an article of manufacture comprising the instruction apparatus. The apparatus implements the functions specified in one or more flows and/or one or more blocks of the flowchart illustrations and/or block diagrams.

These computer program instructions can also be loaded onto the computer or other programmable data processing apparatus such that a series of operational steps are performed on the computer or other programmable apparatus to produce computer-implemented processing for execution on the computer or other programmable apparatus. The instructions provide steps for implementing the functions specified in one or more flows and/or one or more blocks of the flowchart illustrations and/or block diagrams.

While certain embodiments of the present invention have been described, it is understood that a person of ordinary skill in the art can modify or change the embodiments after knowing the basic inventive concept. Therefore, the appended claims are intended to be interpreted as including the disclosed embodiments and the modifications and changes falling within the scope of the present invention.

It is apparent that those skilled in the art can make various modifications and variations to the invention without departing from the spirit and scope of the invention. Thus, it is intended that the present invention cover the modifications and variations of the invention.

What is claimed is:

1. A text editing method, comprising:
   acquiring a text-to-be-edited;
   after receiving a trigger operation, generating an edit region;
   segmenting the text-to-be-edited into N number of text segments, and separately displaying the N number of text segments in the edit region, wherein N is a positive integer greater than 1; and
   after receiving an editing operation with respect to the N number of text segments, editing the N number of text segments based on the editing operation, wherein the editing includes applying the editing operation on a target text segment among the N number of text segments and dividing the target text segment into M number of text segment units based on the editing operation, M being a positive integer greater than 1, and wherein the dividing includes
   detecting swipes back and forward on the target text segment and
   in response to detecting the swipes back and forth on the target text segment, dividing the target text segment into the M number of text segment units.

2. The method according to claim 1, wherein, after receiving an editing operation with respect to the N number of text segments, editing the N number of text segments based on the editing operation comprises one of the following operations:
   after receiving the editing operation with respect to a target text segment among the N number of text segments, editing the target text segment based on the editing operation; and
   after receiving the editing operation with respect to the target text segment among the N number of text segments, editing the text segment corresponding to the target text segment based on the editing operation.

3. The method according to claim 1, wherein the text-to-be-edited comprises one of the following:
   the text-to-be-edited entered by a user;
   the text-to-be-edited acquired from a clipboard; and
   the text-to-be-edited received through a network.

4. The method according to claim 1, wherein the trigger operation comprises one of the following operations:
   the trigger operation applied on a preset region on a current interface;
   the trigger operation used to move a cursor;
   a swipe operation applied on the current interface; and
   a shaking operation that shakes an electronic apparatus, wherein the method is applied to the electronic apparatus.

5. The method according to claim 1, wherein segmenting the text-to-be-edited into N number of text segments comprises one of the following:
   segmenting the text-to-be-edited into the N number of text segments based on an on-screen sequence of the text-to-be-edited; and
   segmenting the text-to-be-edited into the N number of text segments based on semantic analysis of the text-to-be-edited.

6. The method according to claim 1, wherein, after separately displaying the N number of text segments in the edit region, the method further comprises:
   determining whether a wrong text segment is present in the N number of text segments; and
   highlighting the wrong text segment in response to determining the wrong text segment is present in the N number of text segments.

7. The method according to claim 1, wherein:
   after separately displaying the N number of text segments in the edit region, the method further comprises:
      determining whether a wrong text segment is present in the N number of text segments; and
      acquiring and displaying a replacement text segment set of the wrong text segment in response to determining the wrong text segment is present in the N number of text segments; and
   editing the N number of text segments based on the editing operation comprises:
      receiving a select operation that selects a target replacement text segment from the replacement text segment set; and
      based on the select operation, replacing the wrong text segment with the target replacement text segment.

8. The method according to claim 1, wherein editing the N number of text segments based on the editing operation comprises: receiving the editing operation applied on the target text segment among the N number of text segments; and performing one of the following operations:
   modifying text content of the target text segment based on the editing operation;
   deleting the target text segment based on the editing operation;
   changing a position of the target text segment among the N number of text segments based on the editing operation; and
   determining a target position and adding an adding-new text segment to the target position based on the editing operation.

9. The method according to claim 8, wherein modifying text content of the target text segment based on the editing operation is performed and comprises:
   acquiring a replacement text segment set of the target text segment based on the editing operation;
   displaying the replacement text segment set;
   receiving a select operation that selects a target replacement text segment from the replacement text segment set; and replacing the target text segment with the target replacement text segment based on the select operation.

10. The method according to claim 8, wherein modifying text content of the target text segment based on the editing operation is performed and comprises:
switching the target text segment to a content edit mode based on the editing operation;
receiving input information entered by a user; and
modifying the target text segment based on the input information.

11. The method according to claim 8, wherein modifying text content of the target text segment based on the editing operation is performed and comprises one of the following:
upon determining the editing operation is a click operation that clicks the target text segment, modifying a text content of the target text segment;
upon determining the editing operation is a press operation that presses the target text segment over a predetermined period, modifying the text content of the target text segment; and
upon determining the editing operation is a swipe operation that swipes in the display region of the target text segment, modifying the text content of the target text segment.

12. The method according to claim 8, wherein deleting the target text segment based on the editing operation is performed and comprises one of the following:
upon determining the editing operation is an operation that moves the target text segment to a preset delete region, deleting the target text segment;
upon determining the editing operation is an operation that drags the target text segment, deleting the target text segment;
upon determining the editing operation is an operation that multiple clicks the target text segment, deleting the target text segment; and
upon determining the editing operation is an operation that swipes back and forward in the display region of the target text segment, deleting the target text segment.

13. The method according to claim 8, wherein:
upon determining the target text segment includes two neighboring text segments, determining the target position includes a position between the two text segments; and
upon determining the target text segment is a single text segment, determining the target position includes a neighboring position of the target text segment.

14. The method according to claim 8, wherein adding the adding-new text segment to the target position is performed and comprises:
based on the target position and the N number of text segments, acquiring an adding-new text segment set;
displaying the adding-new text segment set;
receiving a select operation that selects a target adding-new text segment from the adding-new text segment set; and
based on the select operation, adding the target adding-new text segment to the target position.

15. The method according to claim 8, wherein adding the adding-new text segment to the target position is performed and comprises:
receiving input information entered by a user; and
adding the adding-new text segment to the target position based on the input information.

16. The method according to claim 8, wherein determining the target position based on the editing operation is performed and comprises one of the following:

upon determining the editing operation is a dragging operation that drags the target text segment, determining that a corresponding position of the target text segment is the target position;
upon determining the editing operation is a click operation that clicks the target text segment, determining that the corresponding position of the target text segment is the target position; and
upon determining the editing operation is a dragging operation that drags two neighboring text segments in opposite directions, determining that a position between the two neighboring text segments is the target position.

17. The method according to claim 1, wherein dividing the target text segment into M number of text segment units based on the editing operation comprises:
based on the editing operation, dividing the target text segment into the M number of text segment units in characters;
displaying separately the M number of text segment units; and
after receiving a processing operation that processes the M number of text segment units, based on the processing operation, editing the M number of text segment units.

18. The method according to claim 1, further comprising:
applying the editing operation on a target text segment unit of the M number of text segment units, the target text segment unit being used as the target text segment.

19. A text editing device, comprising: a memory; and a processor coupled to the memory, the processor being positioned to:
acquire a text-to-be-edited;
after receiving a trigger operation, generate an edit region;
segment the text-to-be-edited into N number of text segments, and separately display the N number of text segments in the edit region, wherein N is a positive integer greater than 1; and
after receiving an editing operation with respect to the N number of text segments, edit the N number of text segments based on the editing operation, wherein the editing includes applying the editing operation on a target text segment among the N number of text segments and dividing the target text segment into M number of text segment units based on the editing operation, M being a positive integer greater than 1, and wherein the dividing includes
detecting swipes back and forward on the target text segment; and
in response to detecting the swipes back and forth on the target text segment, dividing the target text segment into the M number of text segment units.

20. The device according to claim 19, wherein editing the N number of text segments based on the editing operation further comprises one of the following operations:
after receiving the editing operation applied on a target text segment among the N number of text segments, edit the target text segment based on the editing operation; and
after receiving the editing operation applied on the target text segment among the N number of text segments, edit the text segment corresponding to the target text segment based on the editing operation.

* * * * *